Patented Nov. 25, 1952

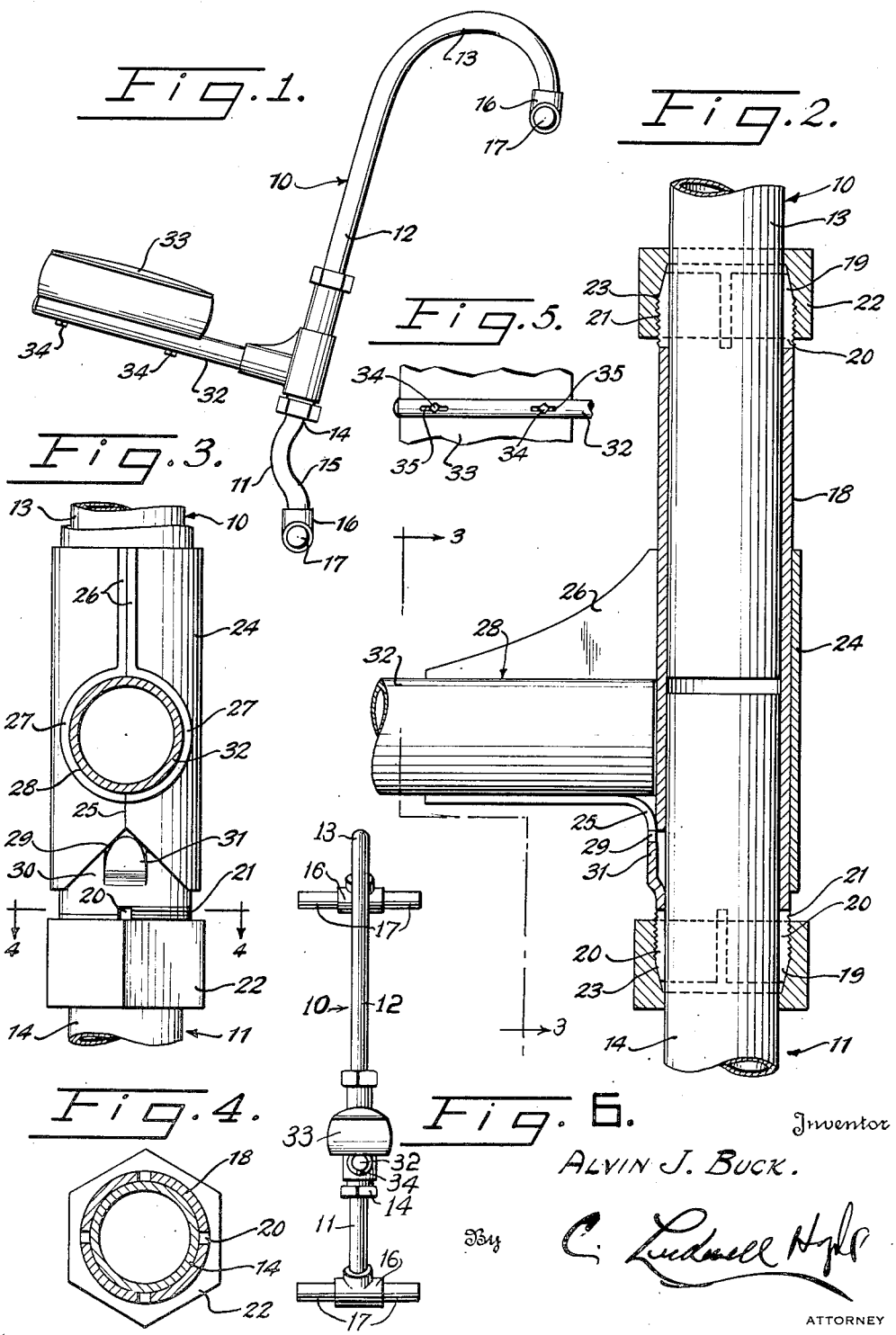

2,619,155

UNITED STATES PATENT OFFICE 2,619,155

ARMREST FOR VEHICLE SEATS

Alvin James Buck, Elkhart, Ind.

Application September 12, 1949, Serial No. 115,300

5 Claims. (Cl. 155—112)

This invention relates to arm rests for vehicle seats having a body support and back rest.

One important object of the invention is to provide a novel form of arm rest capable of attachment to a vehicle seat without the use of screws, bolts or other like devices.

Another object of the invention is to provide a novel form of arm rest which may be attached to a vehicle seat at any desired position along the width of the seat.

A further important object of the invention is to provide a novel form of arm rest for a vehicle seat wherein arrangement is made for ready detachment of the rest from the seat when the rest is not in use so that it may be stored in a suitable part of the vehicle.

Yet another object of the invention is to provide an arm rest for vehicle seats having novel means for adjustment to fit seats having backs of different heights.

A still further object of the invention is to provide an arm rest for vehicle seats wherein novel means is provided for adjustment of the rests to suit different positions of a person's arm above the body rest of the seat.

With the above and other objects in view the invention consists in general of certain novel details of construction and combinations of parts hereinafter fully described, illustrated in the accompanying drawings and particularly claimed.

In the accompanying drawings like characters of reference indicate like parts in the several views, and:

Figure 1 is a side elevation of this invention, ready for application to a vehicle seat, Figure 2 is an enlarged fragmentary side view of the device, the view being partly in elevation and partly in section, Figure 3 is a fragmentary section on the line 3—3 of Figure 2, Figure 4 is a section on the line 4—4 of Figure 3, Figure 5 is a bottom view showing the means for adjustment of the arm pad or cushion, and Figure 6 is a front elevational view of the arm rest and illustrates the T members at the upper and lower ends of the rod construction.

In the construction here shown there is provided a standard having an upper section 10 and a lower section 11. The section 10 has a straight lower part forming a shank 12 and the upper part of the section 10 is curved rearwardly and then downwardly to form a hook 13. The lower section has an upper straight part forming a shank 14 which is axially alined with the shank 12. The lower portion of the section 11 is offset rearwardly as at 15.

On the shanks 12 are fitted the stems of pipe T's 16 and through the heads of these T's passes the brace bars 17. These bars 17 are longitudinally adjustable in the T's 16 and may be held in adjusted position by frictional engagement in the T's or by any other preferred means. Mounted slidably and rotatably on the proximal portions of the shanks 12 and 14 is a sleeve 18 having tapered ends 19 longitudinally split as at 20. The sleeve is provided adjacent each tapered end with screw threaded portions 21. Rotatably mounted on each of the shanks 12 and 14 is a nut 22 which is screwed on the respective threaded portion 21 of the sleeve 18. Each of these nuts has a frusto-conical bore 23 which engages on the respective tapered end 19. It will be plain that when the nuts are turned so as to threadedly advance onto the sleeve 18, the frusto-conical bores 23 will engage on the tapered ends 19 and compress the ends of the sleeve 18 into firm gripping engagement with the shanks 12 and 14. By this arrangement the shanks 12 and 14 may be adjusted toward and from each other and there held. Also the sleeve 18 may be positioned along the shanks 12 and 14 for purposes presently explained.

Slidably and rotatably mounted on the sleeve 18 is an elongated collar 24 split down one side as at 25 and from this split portion extends a pair of forwardly projecting arms 26 curved at 27 to provide a socket 28. From the lower end of the split 25 the bottom edges 29 diverge downwardly and outwardly to form an inverted V-shaped notch 30. A lug or tongue 31 is struck out from the sleeve 18. This lug extends upwardly and is somewhat tapered to assist in engagement of the notch 30 thereon. The socket 28 has its axis preferably perpendicular to the axis of the sleeve 18 and in this socket is fixed one end of a rest arm 32 which, in use, projects forwardly from the socket. On the arm 32 rests an arm pad or cushion 33 which is held in position by lag screws 34 passing through slots 35 so that the cushion 33 may be adjusted along the arm 32 and there held.

In order to use the device the nuts 20 are loosened and the hook 13 engaged over the back of a vehicle seat at a desired point and the lower part 15 with its T is forced in between the rear portion of the seat body rest and the bottom part of the seat back. The sleeve is now adjusted along the shanks 12 and 14 to bring the cushion 33 to desired height. The nuts are now screwed up and the rods 17 adjusted in accordance with the position of the device with respect to the width of the seat. The cushion 33 is now adjusted along the arm 32 and there secured. With all parts thus adjusted the device may be removed from the seat by a simple upward movement and may be replaced by a downward movement. If it be desired to store the device after removal, economy of storage space may be attained by raising the collar 24 until the notch 30 is clear of the lug 31 and rotating the collar until it is substantially at right angles to its position of use with the arm 32 parallel to the rods 17.

What is claimed is:

1. In a vehicle arm rest, a standard including upper and lower sections having alined shank portions adapted for adjustment toward and away from each other, a sleeve slidably mounted on said shanks, means for adjustably anchoring said sleeve to the adjacent shank ends for holding the shanks in adjusted position, said upper section having a seat back-engaging hook at its upper end, the lower section having a rearwardly offset lower end, seat engaging members at the outer ends of said sections and an arm rest projecting laterally of said sleeve.

2. In a vehicle arm rest, a standard including upper and lower sections having alined shank portions adapted for adjustment toward and away from each other, a sleeve slidably mounted on said shanks, means for adjustably anchoring said sleeve to the adjacent shank ends for holding the shanks in adjusted position, said upper section having a seat back-engaging hook at its upper end, the lower section having a rearwardly offset lower end, seat engaging members at the outer ends of said sections and an arm rest projecting laterally of said sleeve, said arm rest including a collar slidably and rotatably mounted on said sleeve, a rod extending forwardly from said collar substantially at right angles thereto and an arm rest cushion carried by said rod.

3. In a vehicle arm rest, a standard including upper and lower sections having alined shank portions adapted for adjustment toward and away from each other, a sleeve slidably mounted on said shanks, means for adjustably anchoring said sleeve to the adjacent shank ends for holding the shanks in adjusted position, said upper section having a seat back-engaging hook at its upper end, the lower section having a rearwardly offset lower end, seat engaging members at the outer ends of said sections and an arm rest projecting laterally of said sleeve, said arm rest including a collar slidably and rotatably mounted on said sleeve, said collar having a notch in its lower end, a lug projecting from said sleeve for engagement in said notch, a rod projecting from said collar substantially at right angles thereto, a cushion mounted on said rod for adjustment therealong and means to secure said cushion in adjusted position.

4. In a vehicle arm rest, a standard including upper and lower sections having alined shank portions adapted for adjustment toward and away from each other, a sleeve slidably mounted on said shanks, means for adjustably anchoring said sleeve to the adjacent shank ends for holding the shanks in adjusted position, said upper section having a seat back-engaging hook at its upper end, the lower section having a rearwardly offset lower end, seat engaging members at the outer ends of said sections and an arm rest projecting laterally of said sleeve, said arm rest including a collar slidably and rotatably mounted on said sleeve, a rod extending forwardly from said collar substantially at right angles thereto, an arm rest cushion carried by said rod and coacting means carried by the collar and sleeve for holding the arm rest in said forwardly extending position.

5. In a vehicle arm rest, a standard including upper and lower sections having alined shank portions adapted for adjustment toward and away from each other, a sleeve slidably mounted on said shanks, means for adjustably anchoring said sleeve to the adjacent shank ends for holding the shanks in adjusted position, said upper section having a seat back-engaging hook at its upper end, the lower section having a rearwardly offset lower end, seat engaging members at the outer ends of said sections and an arm rest projecting laterally of said sleeve, said arm rest including a collar slidably and rotatably mounted on said sleeve, a rod extending forwardly from said collar substantially at right angles thereto, an arm rest cushion carried by said rod and coacting means carried by the collar and sleeve for holding the collar against rotary movement on the sleeve.

ALVIN JAMES BUCK.

REFERENCES CITED

The following references are of record in the file of this patent:

UNITED STATES PATENTS

| Number | Name | Date |
|---|---|---|
| 1,463,293 | Paddock | July 31, 1923 |
| 1,677,326 | Bowen | July 17, 1928 |
| 1,742,822 | Olson | Jan. 7, 1930 |
| 2,184,181 | Fall | Dec. 19, 1939 |